Feb. 18, 1969  G. E. SWANSON  3,428,348

CATCH FOR A PACKING CASE OR THE LIKE

Filed Oct. 22, 1965

INVENTOR
GUNNAR E. SWANSON
BY
McCormick, Paulding & Huber
ATTORNEYS

United States Patent Office 3,428,348
Patented Feb. 18, 1969

3,428,348
CATCH FOR A PACKING CASE OR THE LIKE
Gunnar E. Swanson, Middletown, Conn., assignor to The Nielsen Hardware Corporation, Hartford, Conn., a corporation of Connecticut
Filed Oct. 22, 1965, Ser. No. 501,425
U.S. Cl. 292—113     3 Claims
Int. Cl. B65d 45/24

ABSTRACT OF THE DISCLOSURE

A packing case catch has a drawbar which is adjustable in length to readily adapt it to proper engagement with a strike when the catch and the strike are attached to a case. The adjustment is accomplished by a threaded shank on one drawbar part which passes through an opening in the other part and receives an adjustment nut. The nut is a stop nut so as to prevent accidental adjustment and includes one or more surfaces engageable with a simple tool to hold the nut during adjustment. In one embodiment the tool is formed on one of the drawbar parts and is brought into hold engagement with the stop nut by shifting the two drawbar parts out of their normal relative positions.

---

This invention relates to a catch for releasably securing together two separable parts such as the body and cover of a packing case or box. More particularly, the invention deals with a catch of the toggle action type having a drawbar which is moved into and out of engagement with an associated strike by means of a pivoting operating lever.

A general object of the present invention is to provide a catch having a drawbar for engaging a strike and which drawbar is readily adjustable in length without requiring a general or special purpose tool and which will retain its adjustment despite vibrations and manual manipulations which might otherwise unintentionally cause a change in the adjusted length.

Still another object of the present invention is to provide a catch unit of the above character wherein the operating lever is releasably held in its closed position by an easily operated locking device which resists shock loads on the type commonly sustained by packing case catches generally.

A still further object of this invention is to provide a catch of the foregoing character which may be constructed so as to have a relatively low profile.

Still other objects and advantages of the invention will be apparent from the following description and from the drawings forming a part hereof.

The drawings show preferred embodiments of the invention and such embodiments will be described, but it will be understood that various changes may be made from the construction disclosed, and that the drawings and description are not to be constructed as defined or limiting the scope of the invention, the claims forming a part of this specification being relied upon for that purpose.

Of the drawings:

FIG. 9 is a front elevational view of another catch embodying the present invention, the catch being shown in a closed condition.

FIG. 10 is a side view of the catch shown in FIG. 9 with portions of the catch being shown broken away to reveal the structure of other parts.

FIG. 11 is a sectional view taken along the line 11—11 of FIG. 9, the catch being shown in a partially open condition.

FIG. 12 is a front view of the FIG. 9 catch as seen with the operating lever moved to its fully open position.

FIG. 13 is a side view of still another catch embodying the present invention, portions of the catch being shown broken away to reveal the structure of other parts.

FIG. 14 is a fragmentary front elevational view of the FIG. 13 catch as seen with the operating lever in its open position.

FIG. 15 is a side view of still another catch embodying the present invention.

FIG. 16 is a front elevational view of the FIG. 15 catch showing the same in a closed condition and with various parts being broken away to reveal the structure of other parts.

FIG. 17 is a side view of the FIG. 15 catch unit showing the same in a partially open condition.

Figure 1:
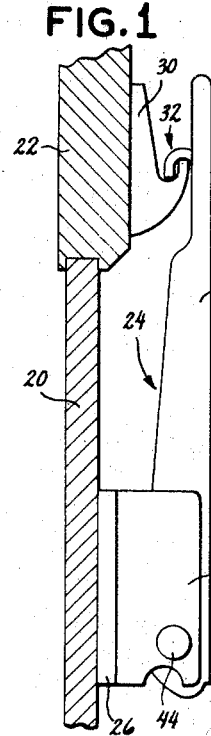
FIG. 1 is a side view of a catch embodying the invention, the catch being shown in a closed condition.

Referring now to the drawings in greater detail, and first more particularly to FIGS. 1 through 5 thereof, these figures show a catch, indicated generally at 24, embodying the invention and adapted to releasably secure to one another two separable panels 20 and 22. These panels 20 and 22 may comprise parts of the body and cover respectively of a packing case or the like, but it should be noted that the catch of this invention is equally well adapted to secure to one another panels and parts other than the body and cover portions of a packing case.

The catch 24 includes a base 26, suitably adapted for attachment to the panel 20, and an operating lever 28. It further includes a drawbar 32 which is pivotally connected to the lower end of the operating lever 28 by a transversely extending pin 34 and which cooperates with a strike 30 attached to the panel 22 above the base 26. The drawbar 32 is adjustable in length and is comprised basically of two parts. These two parts are a strike engageable claw 37 and an inner part 36. The strike engageable claw 37 includes a wide upper portion 39, preferably made of sheet metal, and a threaded shank 38. The inner part 36 is preferably made from formed sheet metal, as shown, and in addition to defining a transverly extending opening for receiving the pivot pin 34 also defines a longitudinally extending centrally arranged opening for loosely receiving the shank 38 of the claw 37. The latter opening is not threaded and a nut 40 is threadably received on the shank 38. The nut 40 is itself received in another opening 42 passing through the part 36 perpendicular to its face and communicating with the longitudinally extending opening.

Figure 2:
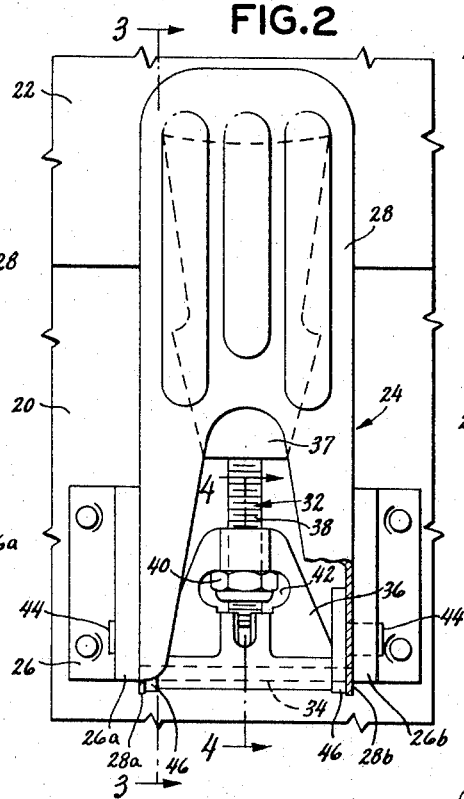
FIG. 2 is a front elevational view of the catch of FIG. 1.
Figure 3:
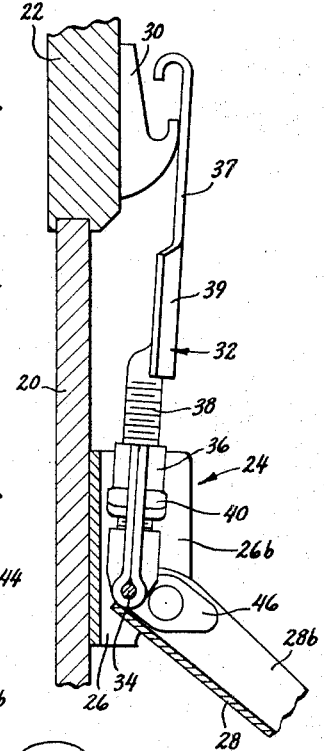
FIG. 3 is a sectional view taken on the line 3—3 of FIG. 2 and showing the catch in its open condition.

The base 26 of the catch 24 is adapted to rest flatly against the surface of the panel 20 and may be secured thereto in any convenient manner, as for example by screws or rivets or the like. Two transversely spaced flanges 26a and 26b extend forwardly from the portion of the base engaging the panel 20 and include aligned openings which receive a pair of pivot pieces or trunnions 44, 44. Each pivot piece or trunnion 44 is in turn fixedly attached to an associated flat link 46 which is welded to an associated one of two transversely spaced and longitudinally extending side flanges 28a and 28b on the operating lever 28. As mentioned, the drawbar part 36 is pivotally connected to the inner end of the operating lever 28 by the transversely extending pivot pin 34 and, as shown in FIG. 2, this pin is pivotally received in openings extending through the operating level side flanges 28a and 28b and through two links 46, 46. As so constructed and arranged, the catch unit 24 can be closed and opened by movement of the operating lever 28 relative to the base about the axis of the trunnions 44, 44. In the closed condition of the catch, the operating lever extends upwardly and overlies the drawbar 32 and strike 30. In the open condition of the catch, the operating lever is displaced a substantial angular distance from the strike, as shown in FIG. 3. Also, the axis of the pivot pin 34 is so located that when the catch is closed, as in FIG. 1, it is located further from the strike than the axis of the trunnions 44, 44 and is also located on the opposite side from the panel 20 of the plane passing through the axis of the trunnions 44, 44 and the point of contact between the drawbar and the strike. The pivot pin 34 is thus moved between the panel 20 and the fixed pivot axis defined by the trunnions 44, 44 as the operating lever is moved between its opened and closed positions and an over center action is produced which retains the operating lever in its closed position.

Figure 4:
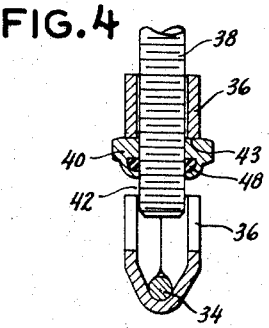
FIG. 4 is an enlarged fragmentary sectional view taken on the line 4—4 of FIG. 2 showing the adjustable drawbar in detail.
Figure 5:
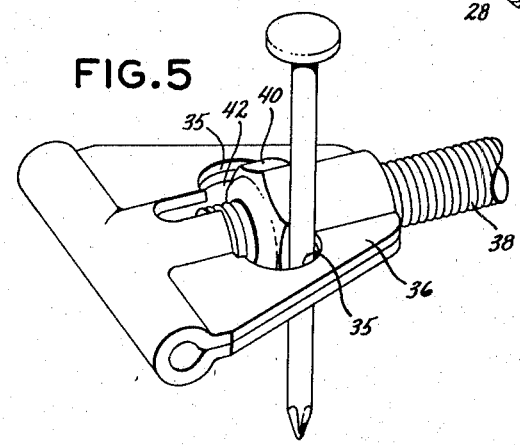
FIG. 5 is an enlarged fragmentary perspective view of the FIG. 1 catch with a common nail being shown in position for longitudinal adjustment of the drawbar.

Referring now to FIGS. 4 and 5 for further details of the adjustable length drawbar, these figures show that the opening 42 in the part 36 defines a forward surface 43 against which the nut bears to limit the forward movement of the claw 37. The opening 42 is further of such a shape as to define side surfaces 35, 35 spaced sufficiently from the periphery of the nut to permit the entry of a spike-like tool. The nut 40 is of the type commonly referred to as a "stop nut" and is provided with an annular elastomeric insert 48 which resiliently engages the threaded claw shank 38 to frictionally retain the nut in any position to which it may be moved relative to the shank. As so constructed, the overall length of the drawbar 32 can be conveniently adjusted by rotating the claw 37 relative to the inner part 36 while holding the nut 40 against rotation relative to the inner part 36. One convenient manner of accomplishing this is depicted in FIG. 5 wherein a common nail 50 is inserted between one of the flats of the nut and one of the side edges 35, 35 of the opening 42. With the nut held in this manner, the claw 37 can be easily rotated by hand to change the length of the drawbar. It will, of course, be obvious that any other readily available spike-like tool could be used in place of the illustrated nail.

Figure 6:
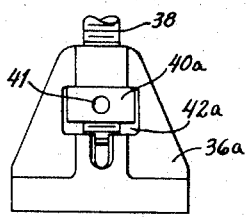
FIG. 6 is a front view of an alternative adjustable drawbar constructed in accordance with the present invention.
Figure 7:
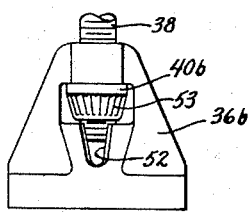
FIG. 7 is a front view of a second alternative adjustable drawbar embodying the present invention.
Figure 8:
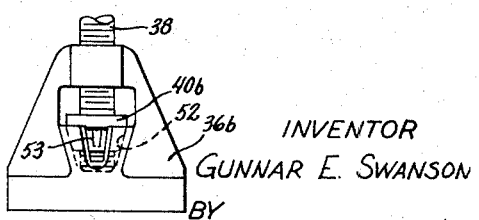
FIG. 8 is a front view of the embodiment shown in FIG. 7 but with the various parts of the drawbar in position for longitudinally adjusting the length thereof.

Alternative adjustable length drawbars suitable for use in the catch of FIG. 1 are shown in FIGS. 6, 7 and 8. Referring first to FIG. 6, the construction there shown includes an inner drawbar part 36a which is generally similar to the part 36 of FIGS. 1 to 5 except that the opening 42a passing therethrough perpendicular to its face is not shaped to receive a nail or other tool between its lateral edge and the peripheral surface of the associated nut. In the FIG. 6 embodiment, the nut 40a which corresponds to the nut 40 of FIGS. 1 to 5 is cylindrical in shape and preferably includes an annular insert of resilient material (not shown) generally similar to the insert 48 of the nut 40. In addition, the cylindrical nut 40a includes at least one radially outwardly opening socket 41 which is preferably of such size as to be capable of receiving a common nail or the like for holding the nut against rotation during adjustment.

In the drawbar construction of FIGS. 7 and 8, a pivoted inner part 36b corresponding generally to the inner part 36 of FIGS. 1 to 5 is provided. The part 36b, however, is shaped to include a conical recess 52 located behind or inboard of the associated nut 40b which preferably includes an annular insert of resilient material (not shown) similar to the insert 48 of the nut 40. The nut 40b is axially symmetrical and has an upper end surface which abuts a cooperating forward surface on the part 36b, as shown in FIG. 7, when the catch is closed. The nut 40b further includes a conically tapered surface 53 conforming generally to the conical recess 52. Therefore, by pushing axially inwardly on the drawbar, the shank 38 can be moved inwardly to seat the nut 40b in the recess 52 and to thereby frictionally restrain the nut against movement relative to the inner part 36b as the claw is rotated. Additional frictional restraint may be obtained, if desired, by knurling or otherwise roughening or deforming the conical surface of the nut and/or the associated conical surface of the part 36b.

The invention claimed is:

1. In a catch for releasably securing one part to another part having a strike, the combination of a base adapted to be fixedly attached to said one part, an operating lever connected with said base for movement relative thereto between open and closed positions, and a drawbar connected to said operating lever for movement into and out of engagement with said strike as a result of said movement of said operating lever, said drawbar including a strike engageable part at its outboard end and another part at its other end, one of said drawbar parts having a threaded shank and the other of said parts having an opening extending longitudinally of said drawbar and in which said threaded shank is slidably received, said other of said parts also including a second opening arranged perpendicular to said longitudinally extending opening and communicating therewith, said second opening defining a bearing surface at one end thereof, and a nut threadably received on said threaded shank which nut is located in said second opening and engageable with said bearing surface to limit the relative movement of said two drawbar parts in one direction, said nut having an end surface and said other part of said drawbar having a bearing surface against which said end surface of said nut bears when said catch is closed with said drawbar in engagement with said strike, and said other part of said drawbar having a second surface spaced on the opposite side of said nut from said bearing surface which second surface is spaced from said nut when said forward end surface of said nut is in engagement with said bearing surface and with which second surface said nut may be brought into engagement by pushing together said two drawbar parts to hold said nut against rotation relative to said other drawbar part.

2. In a catch for releasably securing one part to another part having a strike, the combination of a base adapted to be fixedly attached to said one part, an operating lever connected with said base for movement relative thereto between open and closed positions, and a drawbar connected to said operating lever for movement into and out of engagement with said strike as a result of said movement of said operating lever, said drawbar including a strike engageable part at its outboard end and another part at its other end, one of said drawbar parts having a threaded shank and the other of said drawbar parts having an opening extending longitudinally of said drawbar and in which said threaded shank is slidably received, said other of said parts also including a second opening arranged perpendicular to said longitudinally extending opening and communicating therewith, said second opening defining a bearing surface at one end thereof, and a nut threadably received on said threaded shank which nut is located in said second opening and engageable with said bearing surface to limit the relative movement of said two drawbar parts in one directioon, said nut having a flat end surface and said other part of said drawbar having a bearing surface against which said flat end surface of said nut bears when said catch is closed with said drawbar in engagement with said strike, said nut having a conically tapered portion opposite said flat end surface, and said other part of said drawbar having a generally conically shaped recess opposite said bearing surface and into which said conically tapered portion of said nut may be pushed by pushing together said two drawbar parts to frictionally hold said nut against rotation relative to said other drawbar part.

3. The combination set forth in claim 2 further characterized by said conically tapered portion of said nut being knurled.

References Cited
UNITED STATES PATENTS 3,127,205   3/1964   Griffiths et al. _____ 292—113

MARVIN A. CHAMPION, *Primary Examiner.*

J. A. MOSES, *Assistant Examiner.*